Aug. 31, 1926.
J. K. OLSEN
1,597,691
COMBINED MAGNETIC SPEEDOMETER AND ODOMETER
Filed July 8, 1922
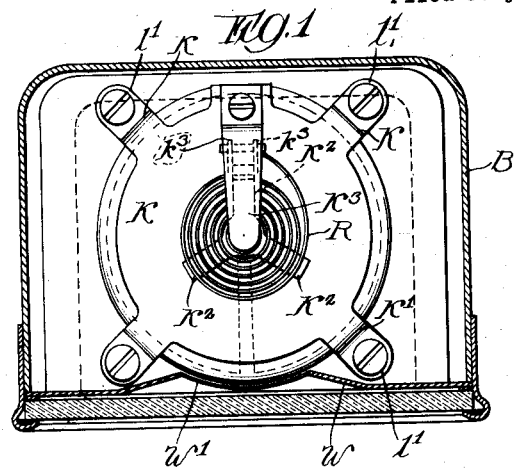
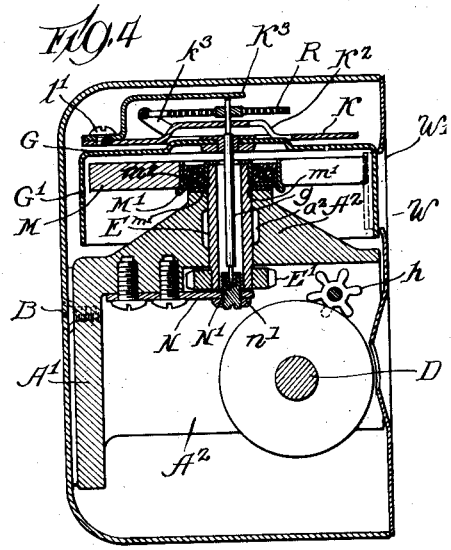
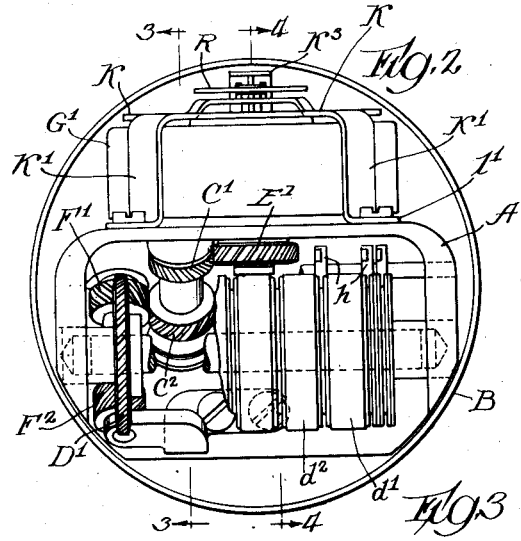
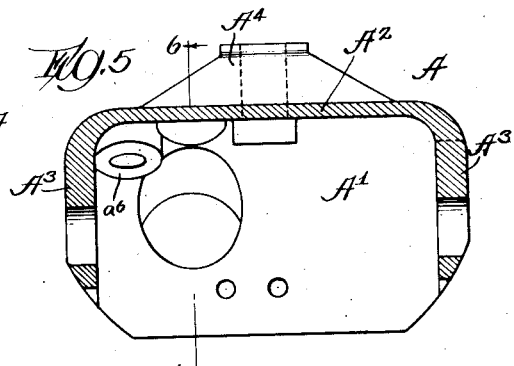
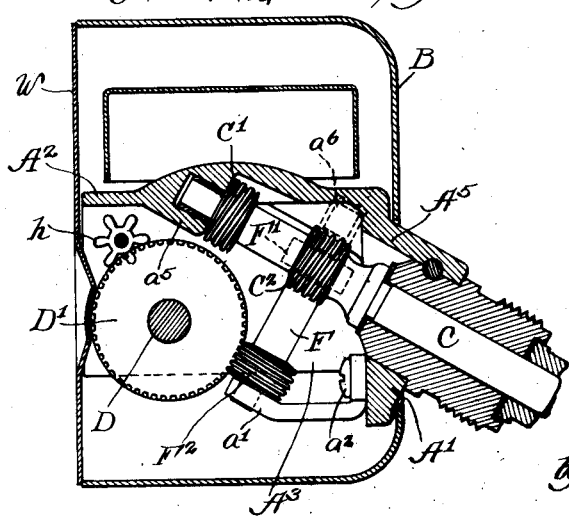
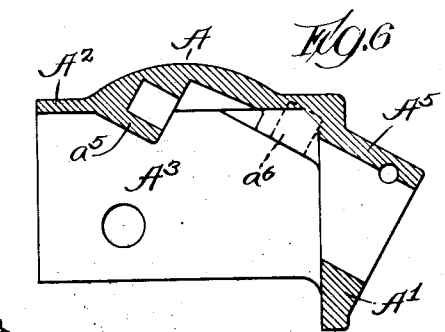
Inventor
John K. Olsen
by Burton & Burton Attys Patented Aug. 31, 1926.

1,597,691

UNITED STATES PATENT OFFICE.

JOHN K. OLSEN, OF CHICAGO, ILLINOIS, ASSIGNOR TO STEWART-WARNER SPEEDOMETER CORPORATION, OF CHICAGO, ILLINOIS, A CORPORATION OF VIRGINIA.

COMBINED MAGNETIC SPEEDOMETER AND ODOMETER.

Application filed July 8, 1922. Serial No. 573,562.

The purpose of this invention is to provide an improved construction of a combined odometer and magnetic speedometer having their respective mechanisms mounted in a frame-in-common and enclosed in a case-in-common, and their respective indications of speed and mileage shown at a dial plate in common, the specific purpose of the invention being to produce a structure which is more compact and easily assembled and economical of manufacture than similar combined instruments in common use. The invention consists in the elements and features of construction shown and described, as indicated in the claims.

In the drawings:—

Figure 1 is a top plan view of a structure embodying this invention, the same being shown within the casing which is in section at its horizontal diameter.

Figure 2 is a front elevation of the same with the face plate and protecting glass and bezel removed, a portion of the odometer train being broken away to disclose parts behind the same.

Figure 3 is a section at the line, 3—3, on Figure 2.

Figure 4 is a section at the line, 4—4, on Figure 2.

Figure 5 is a vertical section of the supporting frame at the axis of the odometer shaft.

Figure 6 is a section at the line, 6—6, on Figure 5.

The structure shown in the drawings comprises a unitary supporting frame, A, which consists of a vertical web, $A^1$, by which it is adapted to be mounted in the bottom or back of the enclosing casing, B, and a horizontal web, $A^2$; forwardly horizontally projecting bracket arms or standards, $A^3$, $A^3$, for the bearings of the odometer shaft, D; vertical bearings, $A^4$, for the shaft of the rotor of the speedometer; oblique bearings, $A^5$, $A^5$, for an in-leading power shaft, and a bearing, $a^6$, for one end of a transverse power-transmitting or counter shaft which obtains bearing for its opposite end in a bracket, $a^1$, secured to the frame member, A, by bolts, $a^2$, taking through the vertical web, $A^1$, of said frame. In the vertical bearing, $A^4$, there is journaled an axially hollow speedometer rotor shaft, E, having secured at its upper end the magnet-carrying rotor, $M^1$, to which there is mounted rigidly the rotating magnet, M. At the lower end of said shaft, E, there is fast on it a gear, $E^1$, through which said shaft and the magnet are driven as hereinafter described. Secured to the under side of the horizontal web, $A^1$, for projecting under the lower end of the rotor shaft, E, is an arm, N, which carries the jeweled step bearing, $N^1$, for the lower end of the spindle, $g$, of the drag element, G, whose cylindrical flange, $G^1$, constitutes the speed indicating dial whose indication is read through the dial plate, W, at the aperture, $W^1$ (see Figure 1). The jeweled step bearing, $N^1$, is screw-threaded and provided with a lock, $n^1$, for its securement in the arm, N, and it is thereby made adjustable vertically to position the drag disk, G, properly as to the air gap between said disk and the top surface of the magnet and the under surface of the field plate, K. This adjustment is utilized in calibrating the instrument. To prevent unskilled tampering with the calibration adjustment is provided at the place indicated where it is substantially inaccessible without dis-assembling the entire instrument. The field plate, K, for concentrating the magnetic flux of the magnet to be cut by the oscillating and biased drag element, is provided with four legs, $K^1$, folded at right angles to the plane of said field plate and extending down outside of and past the magnet, M, and at the lower ends bent outward, forming feet, $l^1$, by which the field plate is mounted and secured upon the upper side of the horizontal web, $A^2$, of the frame, A. The field plate is apertured and in an area around the central portion, forming a tripod spider whose three arms, $K^2$, are struck up from the plane of the field plate, as seen most clearly in Figures 2 and 4, for spacing at a distance above the web of the drag element, G, the upper bearing of the spindle, $g$, which is afforded at the center of said spider and the center of the field plate. Above said upper bearing in the spider there is secured to the spindle the inner end of the biasing spring, R, whose outer end is secured in two lugs $k^3$, $k^3$, which are folded up out of the field plate, being a portion of the metal struck out of the apertures mentioned by which said field plate central portion is given the tripod form mentioned. To the upper side of the field plate at its outer circumference midway between two of the supporting legs, $K^1$, $K^1$, there is secured fast a finger, K³, which is bent upward and then radially inward to overhang and stop the upper end of the spindle, g, above the biasing spring, R.

As indicated, the horizontal shaft, D, of the odometer train is journaled in the forwardly projecting standards or brackets, A³, A³, said journal bearings, and thereby said horizontal shaft, being positioned forward of the axis of the speedometer rotor produced downward. For driving the speedometer, and odometer, the in-leading power shaft, C, is journaled in the obliquely-positioned bearing, A⁵ and a⁵, above mentioned, the axis of said bearings and thereby of said in-leading power shaft, C, being in a plane offset laterally from the fore-and-aft plane of the vertical speedometer rotor shaft, E, preferably as shown, to the left of said shaft. This position of the in-leading shaft is chosen for the purpose of facilitating the driving of the odometer shaft by means of a gear on the extreme left hand end of said shaft, that is, beyond the left hand or highest denomination dial of the odometer train; and this result is further facilitated and obtained by the means employed for transmitting the drive from said in-leading shaft to the odometer shaft, as will be described. The speedometer rotor is driven by means of a spiral gear, C¹, on the inner end of the in-leading power shaft, C, meshing with the suitably mated spiral gear, E¹, above mentioned on the lower end of said speedometer rotor shaft. Back of said gear, C¹, on the shaft, C, there is a spiral gear, C², which meshes with a spiral gear, F¹, on an intermediate shaft, F, which obtains journal bearings at a⁶, on the frame and in the bracket arm, a¹, secured, as above stated, to the vertical web, A¹, of the frame, A, the axis of said journal bearings, and thereby of said shaft, F, being at the intersection of two planes at right angles, respectively, to the in-leading shaft, C, and the odometer shaft, D. The relation of the three shafts, viz. the in-leading shaft or speedometer rotor shaft and the intermediate power-communicating shaft, F, and the speedometer rotor shaft, E, along the axis of the odometer shaft, D, may be clearly seen in Figure 2, from which it will be understood that by this arrangement the gear, F², on the said intermediate shaft, F, is positioned for meshing with and driving the gear, D¹, on the odometer shaft, at the farther end of said shaft, that is, beyond the highest denomination dial wheel thereon, as seen clearly in Figure 2. The purpose of thus positioning the driving wheel on said odometer shaft is to simplify the odometer train by making it possible to drive all the wheels of that train successively from one end of the train, and thereby similarly at the transmission of motion from each wheel to the next succeeding, as may be understood without detail explanation upon observing that the initial wheel of the odometer train, viz, the wheel, d¹, which is at the extreme right and on the assemblage of wheels on the odometer shaft, said wheels, d¹, being fast on said shaft, transmitting reduced speed to the next succeeding wheel, d², by the usual means of carrying pinions, h, on the counter shaft parallel to the odometer shaft, the transmission from wheel to wheel including the dials of the odometer train, being effected in the familiar manner by means of the carrying pinions, which are conventionally shown, and because of their familiarity are not further described.

The drawings show provision for lubrication in the cavity of the magnet mount, M¹, from which lubricant ports, m¹, lead to the bearing of the magnet shaft; and further lubricant space is provided at a², midway in the length of said magnet shaft. These lubrication features are shown and claimed in my co-pending application Serial No. 574.523, filed March 31, 1923, and are not herein claimed. The washer, m², between the magnet mount, M¹, and the journal bearing of the magnet shaft is preferably non-metallic, being made, for example, of suitably prepared fibrous fabric. This tends to prevent magnetic leak. The hollow construction of the magnet shaft facilitates ventilation in tending to prevent heating.

I claim:—

1. In a combined speedometer and odometer, in combination with a frame structure having bearings for an in-leading power shaft, a speedometer rotor shaft and an odometer train shaft; shafts in said bearings respectively; a driving gear on the in-leading shaft, and driven gears on the speedometer rotor shaft and the odometer train shaft respectively, the odometer train shaft being transverse to the fore-and-aft plane of the speedometer rotor shaft, the in-leading shaft being positioned at the left hand of the speedometer rotor shaft and spaced therefrom for accommodating the intermeshing respectively driving and driven gears on said two shafts; a fourth shaft transverse to the in-leading shaft and to the odometer train shaft, and positioned adequately to the left of the fore-and-aft plane of the in-leading shaft for accommodating driving and driven gears from said in-leading shaft and said fourth shaft respectively, said gears and a second gear on said fourth shaft meshing with and driving the gear on the odometer shaft.

2. In a combined odometer and speedometer, a unitary rigid and integral frame for supporting the moving parts of both mechanisms, comprising webs which render it right-angular in cross-section in a plane containing the axis of the speedometer rotor.

3. In a combined odometer and speedometer, a unitary rigid and integral frame for supporting the moving parts of both mechanisms, comprising webs which render it right-angular in cross-section in a plane containing the axis of the odometer dials.

4. In a combined odometer and speedometer, a unitary rigid and integral frame for supporting the moving parts of both mechanisms, comprising webs which render it right-angular in cross section in two planes transverse to each other.

In testimony whereof, I have hereunto set my hand at Chicago, Illinois, this 5th day of July, 1922.

JOHN K. OLSEN.